United States Patent
Almaer et al.

(10) Patent No.: US 12,411,841 B2
(45) Date of Patent: Sep. 9, 2025

(54) SYSTEMS AND METHODS FOR AUTOMATICALLY GENERATING SOURCE CODE

(71) Applicant: Shopify Inc., Ottawa (CA)

(72) Inventors: Dion Almaer, Boulder, CO (US); David Geddes, Herriman, UT (US); Teddy Hwang, Toronto (CA); Darius Gai, Grimsby (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 18/362,143

(22) Filed: Jul. 31, 2023

(65) Prior Publication Data

US 2024/0362209 A1   Oct. 31, 2024

Related U.S. Application Data

(60) Provisional application No. 63/498,626, filed on Apr. 27, 2023.

(51) Int. Cl.
| | |
|---|---|
| *G06F 16/242* | (2019.01) |
| *G06F 8/30* | (2018.01) |
| *G06F 16/245* | (2019.01) |

(52) U.S. Cl.
CPC ............ *G06F 16/2433* (2019.01); *G06F 8/30* (2013.01); *G06F 16/245* (2019.01)

(58) Field of Classification Search
CPC .... G06F 16/33; G06F 16/2433; G06F 16/245; G06F 16/242; G06F 16/332; G06F 16/903; G06F 16/9032; G06F 8/30
See application file for complete search history.

(56) References Cited

U.S. PATENT DOCUMENTS

| | | | |
|---|---|---|---|
| 12,030,183 B1* | 7/2024 | Rose | B25J 9/163 |
| 12,079,185 B2* | 9/2024 | Misiewicz | G06F 16/2438 |
| 2005/0154740 A1* | 7/2005 | day | G06F 16/24549 |
| 2008/0071776 A1* | 3/2008 | Cho | G06F 16/9535 |
| | | | 707/999.005 |
| 2020/0311070 A1* | 10/2020 | Yan | G06N 20/00 |
| 2020/0380470 A1* | 12/2020 | Wakankar | G06Q 10/1053 |
| 2021/0124738 A1* | 4/2021 | Swamy | G06N 20/00 |
| 2021/0133196 A1* | 5/2021 | Gladwin | G06F 21/6227 |
| 2021/0201351 A1* | 7/2021 | Nag | G06F 16/24534 |
| 2021/0406260 A1* | 12/2021 | Sharifi | G06F 18/214 |
| 2022/0207038 A1* | 6/2022 | Cenciotti | G06F 18/214 |
| 2023/0315766 A1* | 10/2023 | Cho | G06F 16/3338 |
| | | | 707/722 |
| 2024/0070270 A1* | 2/2024 | Mace | G06F 21/554 |
| 2024/0256426 A1* | 8/2024 | Wang | G06F 16/258 |
| 2024/0256588 A1* | 8/2024 | Bischof | G06F 16/316 |

(Continued)

*Primary Examiner* — Alicia M Willoughby
(74) *Attorney, Agent, or Firm* — Rowand LLP

(57) ABSTRACT

A computer-implemented method is disclosed. The method includes: receiving a request for retrieval of data satisfying one or more criteria, the request including at least one data request parameter; searching a database storing example queries based on the request to identify at least one matching query; providing, to a large language model (LLM), an input prompt to generate a query purporting to retrieve data satisfying the one or more criteria, the input prompt including the at least one data request parameter and the at least one matching query as an example; and receiving, from the LLM, a result including the generated query.

18 Claims, 7 Drawing Sheets

(56) References Cited

U.S. PATENT DOCUMENTS

| | | | |
|---|---|---|---|
| 2024/0281222 A1* | 8/2024 | Trummer | G06F 8/35 |
| 2024/0289861 A1* | 8/2024 | Wang | G06Q 30/0643 |
| 2024/0311619 A1* | 9/2024 | Licato | G06N 3/0455 |
| 2024/0330279 A1* | 10/2024 | Truong | G06F 16/2428 |
| 2025/0037711 A1* | 1/2025 | Baeuml | G06F 40/35 |

* cited by examiner

SYSTEMS AND METHODS FOR AUTOMATICALLY GENERATING SOURCE CODE

CROSS-REFERENCE TO RELATED APPLICATION

The present application claims the benefit of priority to U.S. Provisional Patent Application No. 63/498,626 filed on Apr. 27, 2023, the contents of which are incorporated herein by reference.

TECHNICAL FIELD

The present disclosure relates to software development and, more particularly, to techniques that leverage use of large language models (LLMs) for generating source code.

BACKGROUND

Generative artificial intelligence models are increasingly being used across many domains. These models (e.g., large language models, etc.) can be used to generate various content, such as text and images, conditioned on input of natural language prompts.

BRIEF DESCRIPTION OF THE DRAWINGS

Reference will now be made, by way of example only, to the accompanying drawings which show example embodiments of the present application, and in which.

Like reference numerals are used in the drawings to denote like elements and features.

DETAILED DESCRIPTION OF IMPLEMENTATIONS

Figure 1:
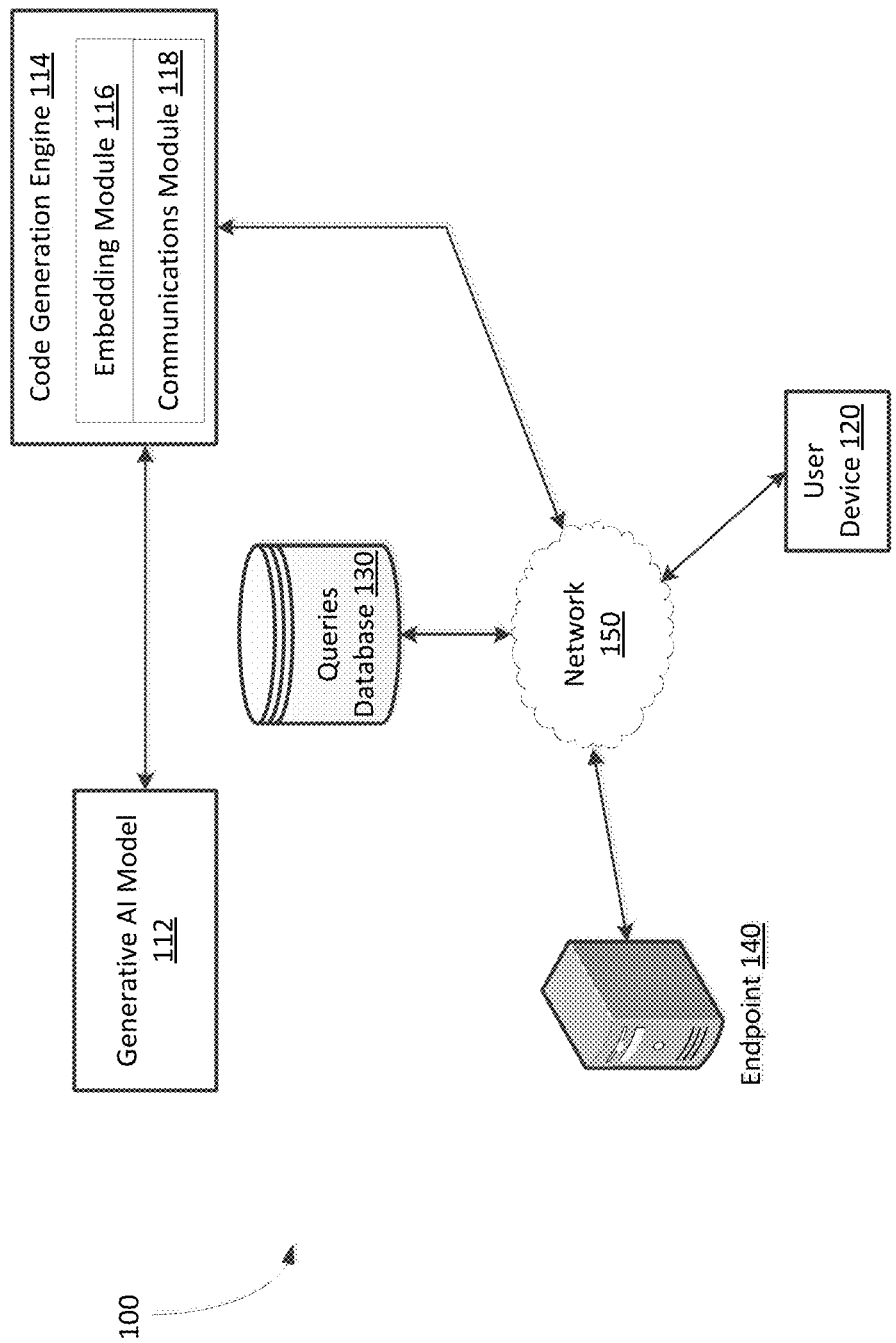
FIG. 1 illustrates, in block diagram form, an example system for implementing a code generation engine that integrates use of a generative AI model.

In an aspect, the present application discloses a computer-implemented method. The method may include: receiving a request for retrieval of data satisfying one or more criteria, the request including at least one data request parameter; searching a database storing example queries based on the request to identify at least one matching query; providing, to a large language model (LLM), an input prompt to generate a query purporting to retrieve data satisfying the one or more criteria, the input prompt including the at least one data request parameter and the at least one matching query as an example; and receiving, from the LLM, a result including the generated query.

In some implementations, the method may further include: generating a first embedding based on the request in an embedding space comprising embeddings of one or more previous queries; identifying a matching embedding for the first embedding in the embedding space; and retrieving a second query associated with the matching embedding.

In some implementations, generating the first embedding may include generating an embedding based on the at least one data request parameter.

In some implementations, identifying the matching embedding may include performing a search of the embedding space to locate an embedding associated with a successful previous query that is closest to the first embedding.

In some implementations, the method may further include: transmitting, to an endpoint, the generated query; receiving, from the endpoint, a response indicating an error associated with the generated query; and providing, to the LLM, a further input prompt for generating a revised query, the further input prompt including error data associated with the error.

In some implementations, the error data may include an indication of one or more error locations in computer code associated with the generated query.

In some implementations, an error location may be identified by at least one of a line number or character number containing erroneous code.

In some implementations, the method may further include: transmitting, to an endpoint, the generated query; receiving, from the endpoint, a response indicating that the generated query is accepted by the endpoint; and updating the database by including the generated query.

In some implementations, the response may include first data from the endpoint associated with the at least one data request parameter.

In some implementations, identifying the matching embedding may include determining that a second embedding satisfies a distance criterion with respect to the first embedding, and the second query may comprise a query, retrieved from cache memory, that is associated with the second embedding.

In another aspect, the present application discloses a computing system. The computing system includes a processor and a memory coupled to the processor. The memory stores computer-executable instructions that, when executed by the processor, may cause the processor to: receive a request for retrieval of data satisfying one or more criteria, the request including at least one data request parameter; search a database storing example queries based on the request to identify at least one matching query; provide, to a large language model (LLM), an input prompt to generate a query purporting to retrieve data satisfying the one or more criteria, the input prompt including the at least one data request parameter and the at least one matching query as an example; and receive, from the LLM, a result including the generated query.

In another aspect, the present application discloses a non-transitory, processor-readable medium storing processor-executable instructions that, when executed by a processor, may cause the processor to: receive a request for retrieval of data satisfying one or more criteria, the request including at least one data request parameter; search a database storing example queries based on the request to identify at least one matching query; provide, to a large language model (LLM), an input prompt to generate a query purporting to retrieve data satisfying the one or more criteria, the input prompt including the at least one data request parameter and the at least one matching query as an example; and receive, from the LLM, a result including the generated query.

Other example implementations of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "generative AI model" may be used to describe a machine learning model. A generative AI model may sometimes be referred to, or may use, a language learning model. A trained generative AI model may respond to an input prompt by generating and producing an output or result. The output/result may be generated by the generative AI model through interpreting the intent and context of the prompt. In some cases, the generative AI model may be implemented with constraints on the acceptable prompts. In some cases, this may include a prompt template. A prompt template may specify that prompts have a certain structure or constrained intents, or that acceptable prompts exclude certain classes of subject matter or intent, such as the production of results or outputs that are violent, pornographic, etc.

Significant advances have been made in recent years in generative AI models. Different implementations may be trained to create digital art, computer code, conversation text responses, or other types of outputs. Examples of generative AI models include Stable Diffusion by Stability AI Ltd., ChatGPT by OpenAI, DALL-E 2 by OpenAI, and GitHub CoPilot by GitHub and OpenAI. The models are typically trained using a large data set of training data. For instance, in the case of AI for generating images, the training data set may include a database of millions of images tagged with information regarding the contents, style, artist, context, or other data about the image or its manner of creation. The generative AI trained on such a data set is then able to take an input prompt in text form, which may include suggested topics, features, styles or other suggestions, and provide an output image that reflects, at least to some degree, the input prompt.

Source Code Generation Using LLMs

Computer code enabling a client to interact with a remote endpoint (e.g., a third-party server) is typically structured as data requests written in a particular computer language, e.g., a programming or query language. An endpoint may implement (or expose) a software interface, such as an application programming interface (API), for offering various services to other computer programs. An API contains and is implemented by function calls, which are language statements that request software to perform particular actions and services. The specification of the API describes functions and other parameters that are supported by the API. The data requests (e.g., queries) directed at an endpoint are required to be compliant with various requirements associated with the endpoint. In particular, query statements for an endpoint must be structured to comply with both the syntax of a query language and any requirements which may be stipulated for queries that are supported by an API (or other software interface) for the endpoint.

In some instances, an LLM may be employed to facilitate generating source code (or simply "code") for interacting with an endpoint. For example, where a programmer is unfamiliar with the query language or the requirements of queries for an endpoint, the programmer may instruct an LLM to automatically generate queries which may be suitable for the endpoint based on a natural language statement of a user request. Auto-generation of code for queries is a challenging task, particularly for object-oriented languages that support nesting such as Java, C++, and the like.

In the absence of fine-tuning, a pre-trained LLM may have limited capacity to produce correctly formed queries for a particular endpoint. However, fine-tuning the model presents its own set of challenges. A large number of example inputs and outputs (e.g., user requests expressed in natural language and corresponding queries written in a query language) may be required for training the model. More generally, it may not be plausible to provide an entire language schema of a query language to an LLM for training. Furthermore, changes to the endpoint's format and/or method of storing data may require frequent re-training of the LLM which can be a time-consuming and resource-intensive process.

Some code generation systems may use hard-coded prompt templates when forming input prompts to an LLM for instructing the LLM to generate a query. The use of hard-coded templates may be limiting. For example, the number and types of defined templates may be limited and as a consequence, the LLM may not be capable of generating queries that are suitable for a variety of user requests.

It is desired to provide a process for automatically generating queries for an endpoint that are based on user requests and that comply with the requirements of the endpoint.

The present application discloses improved techniques of generating code for interacting with an endpoint. A system and methods for producing automatically-generated queries using an LLM are described. More particularly, the proposed system is designed to find optimal example(s) of acceptable code for an endpoint that can be used to facilitate query generation. The system may match a user request (e.g., a data retrieval request) to a "best" prompt template, out of a set of such templates, for an LLM. A prompt template may, for example, comprise a previous query that was accepted by the endpoint or an example of a properly constructed query for the endpoint. The matched template may then be provided in an input prompt to the LLM with instructions to generate a query for submitting to the endpoint.

When a user provides a first data request (expressed using natural language) for an endpoint, the system is configured to instruct an LLM to generate a query for the endpoint, i.e., by converting the first data request to a corresponding query. In at least some implementations, the system generates a first embedding of the first data request in a relevant embedding space. The embedding space may comprise embeddings associated with all or a subset (e.g., only correctly formed queries) of previous data requests to the endpoint. Each such embedding may be associated with a previous data request and the associated query. The first embedding is compared to the other embeddings by, for example, computing similarity between the vectors in the embedding space.

In some implementations, if the first embedding is determined to be sufficiently similar to (i.e., within a threshold distance) an embedding of a previous data request, the system may return a cached query corresponding to the previous data request. That is, instead of making a call to the LLM to generate a new query, the system may return a cached query as the output, i.e., query corresponding to the first data request. The threshold distance may be set manually or automatically, and defined using a suitable distance metric (e.g., Euclidean distance).

More generally, the system identifies an embedding that matches (e.g., nearest neighbor or otherwise closest to) the first embedding, and retrieves a previous query (in the specified query language) that is associated with the identified embedding. The system may, for example, perform a vector search to identify said closest embedding. In at least some implementations, the system may only search embeddings associated with previous queries that are known to have invoked a successful response from the endpoint. That is, the system may identify the closest one of the embeddings associated with correctly formed queries for the endpoint.

The retrieved previous query is provided, along with the first data request, as input to the LLM. In particular, the first data request and the retrieved previous query may be included as part of an input prompt to the LLM, with instructions for the LLM to generate a query for the endpoint. In this way, the LLM may be provided with a "best" example of a desired output, i.e., a query that captures the user's request and that is compliant with the requirements of the endpoint, when generating the query.

The system may then provide the generated query to the endpoint. If the system receives an error response from the endpoint, details about the error, i.e., error data, may be obtained and provided as further input to the LLM. The error data may specify, for example, information on the line number, character number, etc. that contains the erroneous code. The error data is provided as part of an input prompt to the LLM to re-generate the query for the endpoint. Other feedback from the endpoint may be additionally provided to the LLM in the instruction to re-generate the query.

This process of instructing the LLM to generate a query corresponding to the first data request based on modifying an input prompt to the LLM may proceed iteratively until a successful response is received from the endpoint. Upon determining a successful query, i.e., a query that is accepted by the endpoint, the system may update a knowledge base, such as a queries database, storing query information of queries for the endpoint. The knowledge base may indicate previous queries that were accepted by the endpoint and/or examples of queries that would be accepted, i.e., queries that are constructed to comply with requirements of the endpoint and a specific query language. The system may add a successful query to the knowledge base to include a record associated with said query. In particular, the successful query may be stored, in a database, in association with an indication of the first data request.

In some implementations, the system may be configured to flag data requests which would not be supported by a particular endpoint. When a user inputs a data request, an embedding associated with the data request may be generated, and compared to embeddings for previous data requests. If the newly generated embedding matches an embedding associated with a query that produced an error response from the endpoint, the system may alert the user without making a call to the LLM to generate a query for the endpoint.

In some implementations, the system may instruct the LLM to examine the response from the endpoint and describe semantically the information contained within the response, and whether it is appropriate for the user request.

To illustrate additional details regarding the methods and systems of the present application, some concepts relevant to generative AI models, neural networks, and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train an ML model that is intended to classify images, the training dataset may be a collection of images. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly-available text corpuses may be, e.g., fine-tuned by further training using the complete works of Shakespeare as training data samples (e.g., where the intended use of the ML model is generating a scene of a play or other textual content in the style of Shakespeare).

Figure 6:
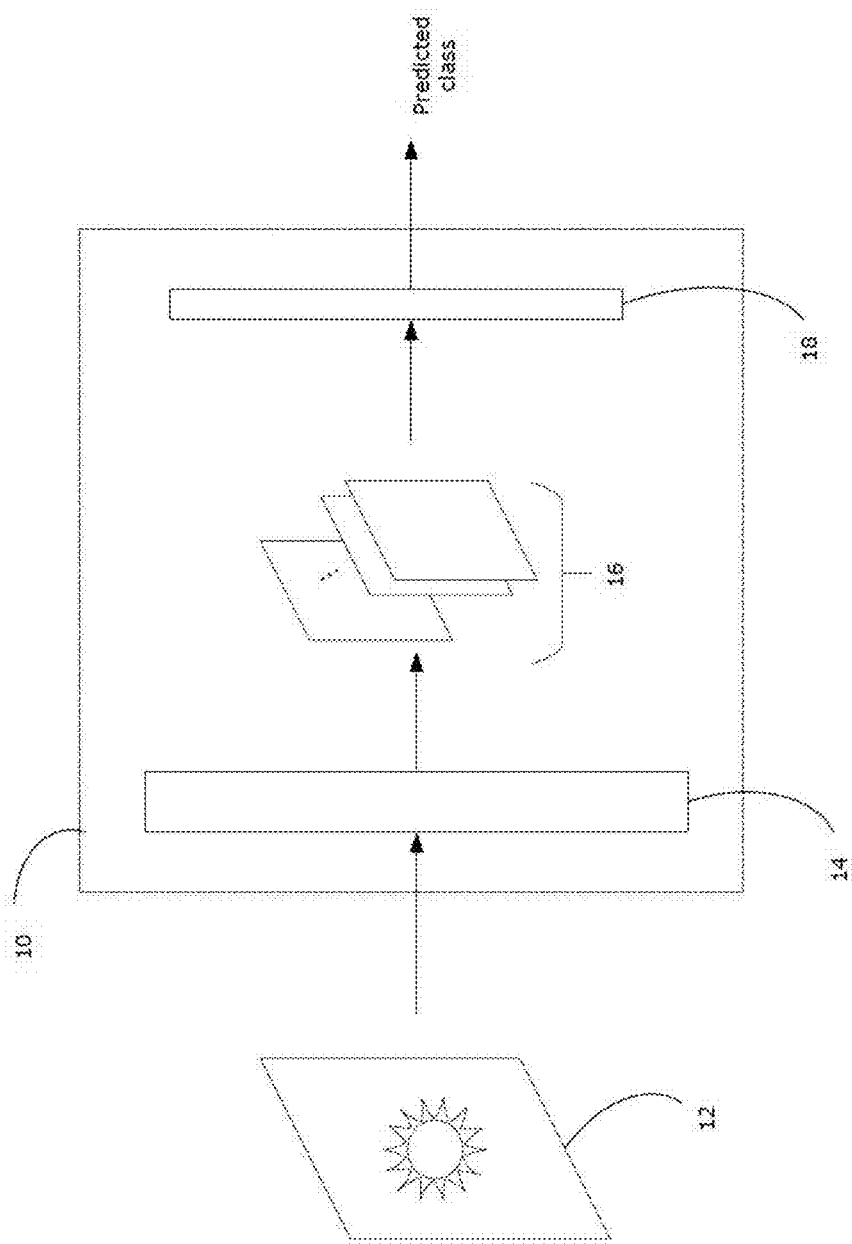
FIG. 6 is a block diagram of a simplified convolutional neural network, which may be used in examples of the present disclosure.

FIG. 6 is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to an ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 7:
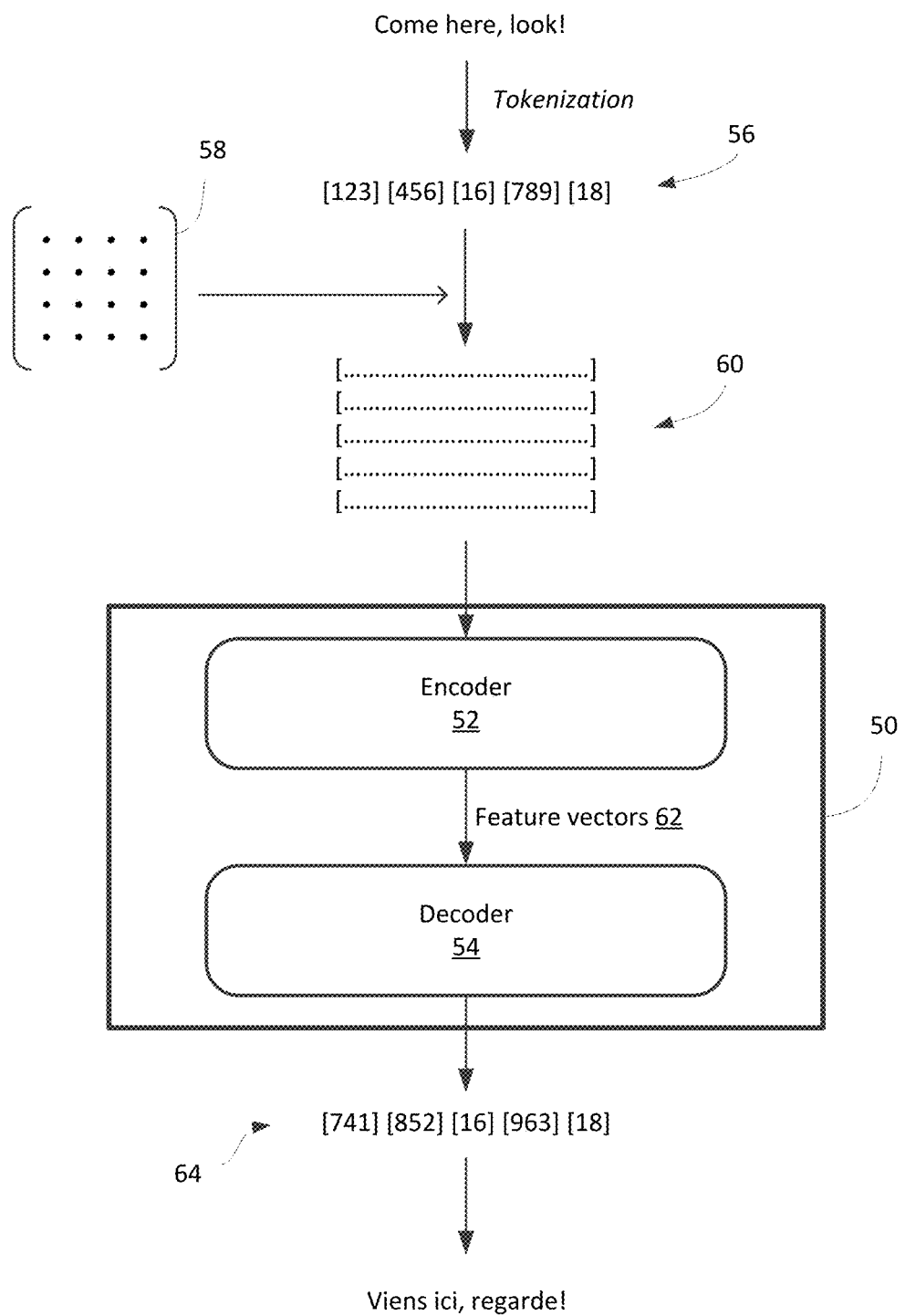
FIG. 7 is a block diagram of a simplified transformer neural network, which may be used in examples of the present disclosure.

FIG. 7 is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 7, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 9 for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally, or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally, or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 5:
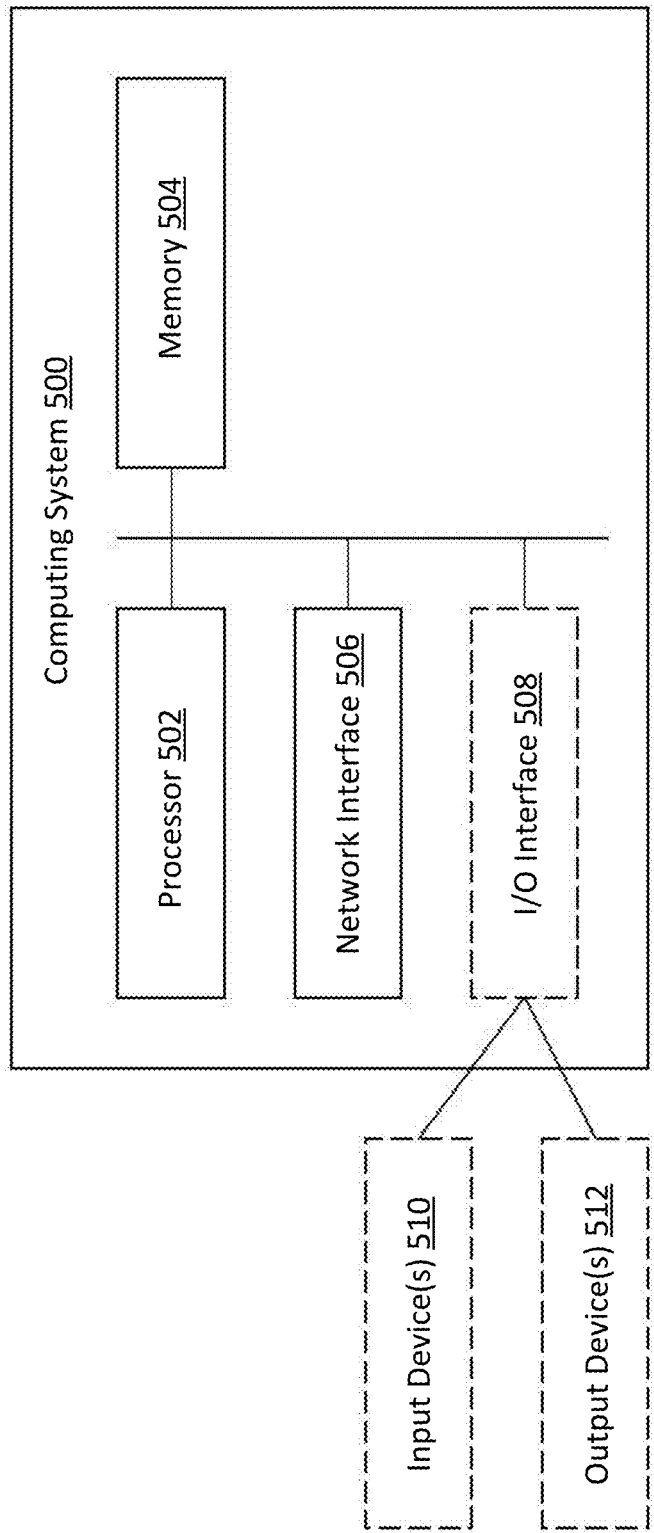
FIG. 5 is a block diagram of an example computing system, which may be used to implement examples of the present disclosure.

FIG. 5 illustrates an example computing system 500, which may be used to implement examples of the present disclosure, such as a prompt generation engine to generate prompts to be provided as input to a language model such as an LLM. Additionally, or alternatively, one or more instances of the example computing system 500 may be employed to execute the LLM. For example, a plurality of instances of the example computing system 500 may cooperate to provide output using an LLM in manners as discussed above.

The example computing system 500 includes at least one processing unit, such as a processor 502, and at least one physical memory 504. The processor 502 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 504 may include a volatile or non-volatile memory (e.g., a flash memory, a random-access memory (RAM), and/or a read-only memory (ROM)). The memory 504 may store instructions for execution by the processor 502, to the computing system 500 to carry out examples of the methods, functionalities, systems and modules disclosed herein.

The computing system 500 may also include at least one network interface 506 for wired and/or wireless communications with an external system and/or network (e.g., an intranet, the Internet, a P2P network, a WAN and/or a LAN). A network interface may enable the computing system 500 to carry out communications (e.g., wireless communications) with systems external to the computing system 500, such as a language model residing on a remote system.

The computing system 500 may optionally include at least one input/output (I/O) interface 508, which may interface with optional input device(s) 510 and/or optional output device(s) 512. Input device(s) 510 may include, for example, buttons, a microphone, a touchscreen, a keyboard, etc. Output device(s) 512 may include, for example, a display, a speaker, etc. In this example, optional input device(s) 510 and optional output device(s) 512 are shown external to the computing system 500. In other examples, one or more of the input device(s) 510 and/or output device(s) 512 may be an internal component of the computing system 500.

A computing system, such as the computing system 500 of FIG. 5, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

Reference is made to FIG. 1, which illustrates, in block diagram form, an example system 100 for implementing a source code management system. The system 100 may be implemented using one or more computing devices.

The system 100 includes a generative AI model 112, a code generation engine 114, an embedding module 116, a communications module 118, an endpoint 140, and a queries database 130. The generative AI model 112 is an unsupervised or semi-supervised machine learning algorithm that has been trained using a set of training data content. The generative AI model 112 may be a transformer 50 (FIG. 7), as described above. Input prompts may be provided to the generative AI model 112, and the model may produce outputs related to the input prompts. The generative AI model 112 may be a generative adversarial network, and/or a transformer-based model.

The code generation engine 114 performs auto-generation of source code. In particular, the code generation engine 114 may output code representing user requests that are directed to an endpoint 140. An endpoint 140 refers to a remote computing device that communicates with a network to which it is connected and may be a mobile device, a desktop computer, a virtual machine, an embedded device, a server, or the like. The code generation engine 114 may be configured to convert user requests that are expressed in natural language to code for queries corresponding to the user requests.

The code generation engine 114 receives data requests from user devices 120 via a network 150. A data request may, for example, be a user request to retrieve certain resources (e.g., data objects, field values of objects, etc.) from the endpoint 140. For example, in the context of e-commerce, the requested data may relate to products, collections, customers, orders, carts, checkouts, and other store resources that can be used to build a custom purchasing experience for an online store. The data request may be expressed in natural language and include information identifying the requested resources. In some implementations, the data request may be received via a user interface on the user device 120. For example, the data request may comprise a statement (e.g., "Get the 3 most recently created products.") that is input via a text input field associated with a software development environment accessed on the user device 120.

Upon processing a data request from a user, the code generation engine 114 may generate a query that corresponds to the data request for the endpoint. In particular, code for a query that represents the data request may be generated by the code generation engine 114. The generated query may then be transmitted to the endpoint 140 via the network 150. For example, a communications module 118 of the code generation engine 114 may be configured to transmit the generated query to an API endpoint associated with a third-party server from which a resource is desired to be retrieved.

The queries database 130 may store data relating to queries that are directed to the endpoint 140. In some implementations, the queries database 130 may contain a list of previous queries that were transmitted to the endpoint 140. The list may include both accepted queries and rejected queries. The accepted queries may, for example, be queries that were correctly formed for the endpoint 140. Each query in the queries database 130 may be stored in association with a corresponding user request from which the query was generated. In particular, for each query, the queries database 130 may indicate an association between the query and the user request-expressed in natural language—that the query is designed to represent.

In some implementations, the code generation engine 114 may be configured to perform searches of a relevant search space. The search may, for example, be a keyword search, a vector similarity search, or a hybrid search. The search space may comprise data sources, such as private or public repositories of data, document libraries, etc., or an embedding space corresponding to one or more such data sources. For example, the code generation engine 114 may perform searches of the queries database 130 or an embedding space corresponding to the queries database 130. The code generation engine 114 may implement a suitable search algorithm which may depend, at least in part, on the type of requested search, the relevant search space, and/or the query data.

In some implementations, the code generation engine 114 may be configured to perform vector searches. A vector search uses vector embeddings for representing and searching content. The code generation engine 114 may index various data objects using vector embeddings. As a specific example, data requests from users may be represented using embeddings. For each data request, the text of the request may be wholly or partially represented by a suitable feature vector. In this way, a plurality of different data requests may be embedded in a single embedding space.

An embedding module 116 creates vector representations of data. Embeddings are computed using machine learning models. The embedding module 116 is configured to implement one or more embedding models for processing different types of data. Examples of pre-trained embedding models which may be implemented include: Word2Vec, Doc2Vec, Universal Sentence Encoder, Global Vectors (GloVe), Embeddings from Language Models (ELMo), FastText, MobileNet v2, SentenceBERT, InferSent, etc.

The code generation engine 114 may also be configured to compute similarity between the vectors in an embedding space. In particular, the code generation engine 114 may use one or more metrics for calculating vector similarity such as, but not limited to, L2 (Euclidean) distance, cosine similarity, and inner product (dot product). Various algorithms for vector similarity search may be implemented by the search engine. Examples include k-nearest neighbor (kNN), approximate nearest neighbors (ANN) search, space partition tree and graph (SPTAG), Faiss, and hierarchical navigable small world (HNSW).

In at least some implementations, the generative AI model 112 and the code generation engine 114 may be included in, or be accessed by, a source code management system. That is, a source code management system may implement various functions of the generative AI model 112 and the code generation engine 114. While FIG. 1 shows the generative AI model 112 and the code generation engine 114 as separate components of system 100, it will be understood that the code generation engine 114 may be configured to implement various features of the generative AI model 112.

The network 150 is a computer network. In some implementations, the network 150 may be an internetwork such as may be formed of one or more interconnected computer networks. For example, the network 150 may be or may include an Ethernet network, an asynchronous transfer mode (ATM) network, a wireless network, or the like.

In some example implementations, the code generation engine 114 may be integrated as a component of an e-commerce platform. That is, an e-commerce platform may be configured to implement example embodiments of the code generation engine 114. In particular, the subject matter of the present application, including example methods for generating source code for interacting with endpoints, may be employed in the specific context of e-commerce. For example, the code generation engine 114 may be adapted to facilitate automatically generating queries for submitting to an endpoint associated with an e-commerce platform.

Figure 2:
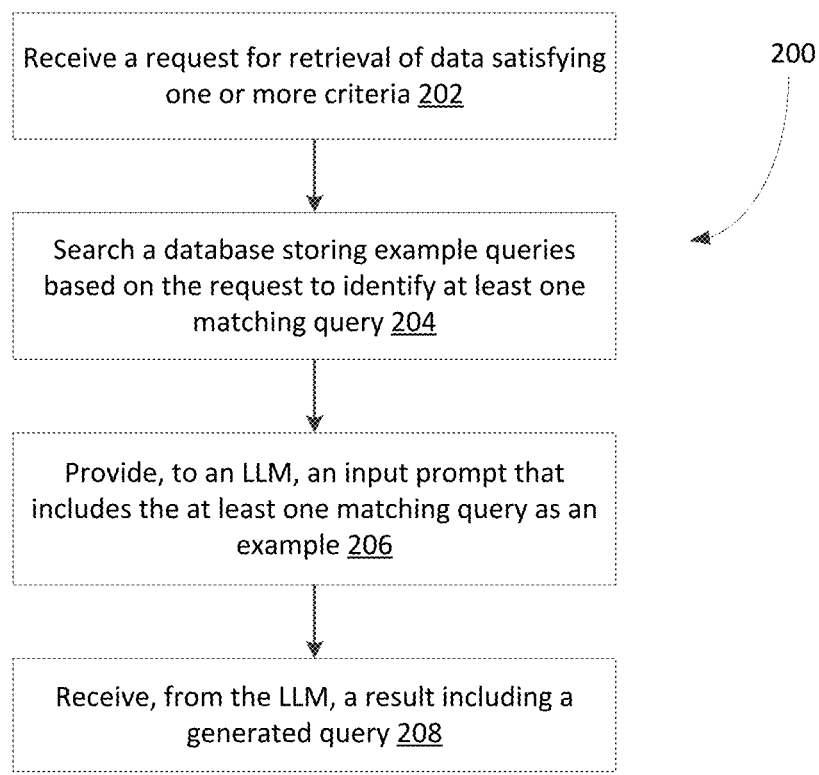
FIG. 2 shows, in flowchart form, an example method for generating source code for interacting with an endpoint.

Reference is now made to FIG. 2, which shows, in flowchart form, an example method 200 for generating source code for interacting with an endpoint. More particularly, client-side code for querying a remote endpoint may be generated in accordance with the method 200. The method 200 may be implemented, at least in part, on a computing system for code generation, such as the system 100 of FIG. 1.

A code generation system may build and maintain a database of queries (such as the queries database 130 of FIG. 1) that are directed to an endpoint. In some implementations, the database may store previous queries which were accepted by the endpoint, i.e., queries that were correctly formed for the endpoint and/or an associated software interface (e.g., API endpoint). Additionally, or alternatively, the database may store examples of queries that would be accepted by the endpoint. The example queries may not be actual queries which were previously transmitted to the endpoint; instead, the example queries may comprise constructed examples of queries that comply with the requirements of the endpoint and a specific query language. The queries may be stored in association with the corresponding user requests from which the queries were derived. That is, for each stored query, the database may indicate an association between the query and the corresponding user request that is represented by the query. As will be described in greater detail below, the system may use the queries database to identify a "matching" query for any given user request, and this matching query may be provided to an LLM for generating a new query corresponding to the user request.

In operation 202, the computing system receives a first user request to retrieve certain data from an endpoint. The first user request may be expressed in natural language and contain an indication of request parameters associated with the data retrieval request. The first user request may, for example, comprise an identifiable directive to retrieve data satisfying defined criteria from the endpoint. The data retrieval request may be received via a user device. For example, the data retrieval request may comprise a statement (e.g., "Get the 3 most recently created products.") that is input via a text input field associated with a software development environment accessed on the user device.

The computing system searches the queries database based on the request to identify at least one matching query, in operation 204. In at least some implementations, the computing system may perform comparisons between the first user request and the user requests corresponding to the stored queries of the queries database to determine a closest match, or "matching" user request. That is, the first user request may be compared with one or more user requests that are identified in the queries database. A query which corresponds to a matching user request may be determined to a matching query.

Various techniques may be used to compare the first user request with the set of user requests of the queries database. In some implementations, the computing system may perform a search of the set of user requests to identify a closest match. For example, a keyword-based search may be performed using either the first user request as a phrase or the individual terms contained in the first user request. The results of the search may be ranked and a highest ranked result may be determined to be a matching user request for the first user request.

In some implementations, the computing system may implement a text similarity algorithm which may be used for measuring a degree to which the first user request is semantically related to each user request of the queries database. For example, the computing system may convert the first user request and the user requests of the queries database into vectors, or embeddings, that capture semantic information, and compute vector similarity using one or more suitable metrics (e.g., Euclidean distance, etc.). The "closest" vector may represent the user request that matches the first user request.

In operation 206, the computing system provides, to a large language model (LLM), an input prompt to generate a query purporting to retrieve the requested data. The input prompt includes data request parameters of the data retrieval request and an indication of the at least one matching query. In particular, the at least one matching query is included in the input prompt as an example query. For example, the LLM may be instructed explicitly to use the at least one matching query as an example when generating the new query corresponding to the first user request.

In operation 208, the computing system receives, from the LLM, a result including the generated query. The result may indicate information about the generated query, such as the query language, data fields, arguments, etc. The generated query may be provided to the user device as a response to the first user request. That is, the computing system may output the generated query responsive to receiving the first user request via the user device. The requesting user may then modify the generated query, incorporate the query into source code, or otherwise manipulate the code of the generated query. Additionally, or alternatively, the generated query may be automatically transmitted to the endpoint (or associated API). In particular, the computing system may transmit the generated query directly to the endpoint without obtaining an explicit confirmation from the requesting user. In this way, the endpoint may be queried automatically using the generated query.

Figure 3:
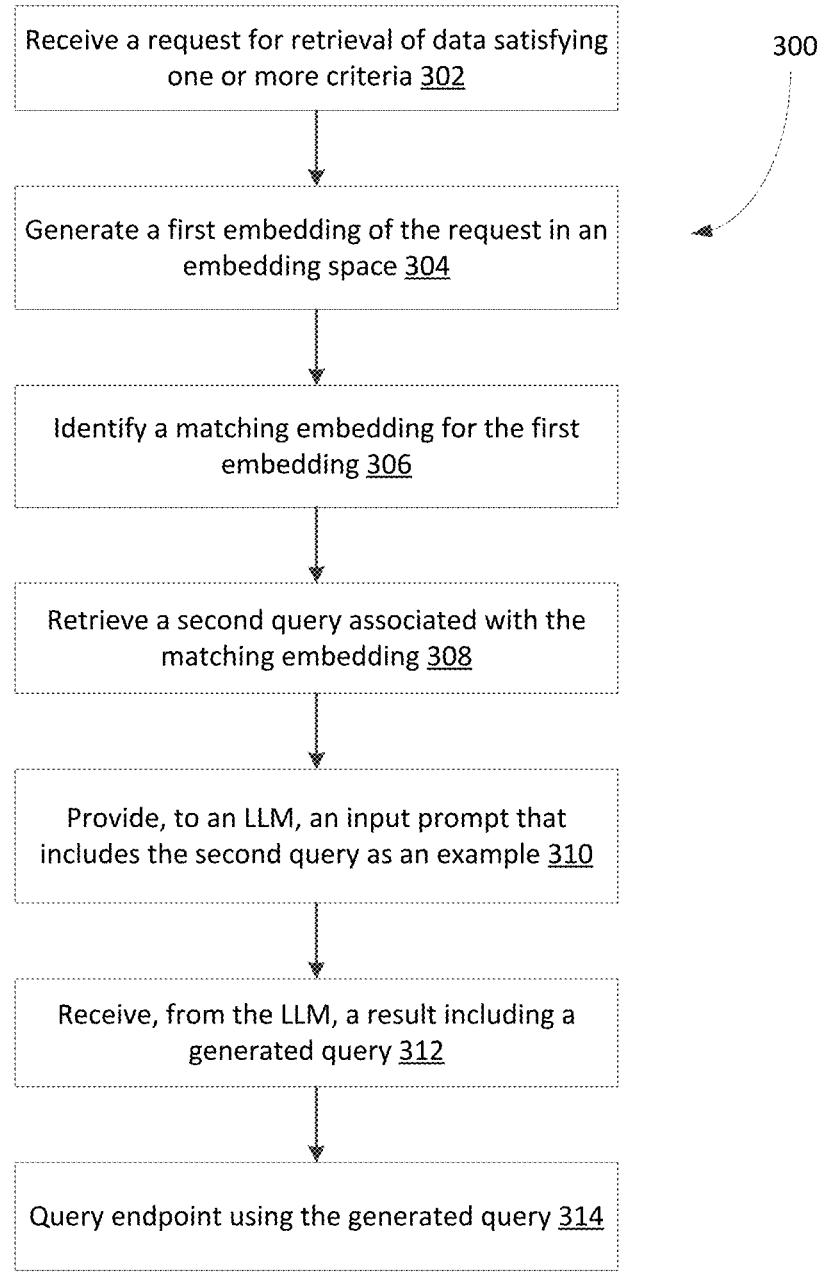
FIG. 3 shows, in flowchart form, another example method for generating source code for interacting with an endpoint.

Reference is now made to FIG. 3, which shows, in flowchart form, another example method 300 for generating source code for interacting with an endpoint. More particularly, client-side code for querying a remote endpoint may be generated in accordance with the method 300. The method 300 may be implemented, at least in part, on a computing system for source code generation, such as the system 100 of FIG. 1. The operations of method 300 may be performed in addition to, or as alternatives of, one or more of the operations of method 200.

In operation 302, the computing system receives a first user request to retrieve certain data from an endpoint. The first user request may be expressed in natural language and contain an indication of request parameters associated with the data retrieval request. The first user request may, for example, comprise an identifiable directive to retrieve data satisfying defined criteria from the endpoint. The data retrieval request may be received via a user device. For example, the data retrieval request may comprise a statement (e.g., "Get the 3 most recently created products.") that is input via a text input field associated with a software development environment accessed on the user device.

In operation 304, the computing system generates a first embedding of the first user request in an embedding space. For example, an embedding engine (such as the embedding module 116) of the computing system may generate the first embedding. The first embedding comprises a vector representing a semantic encoding of the first user request. In some implementations, the computing system may generate the first embedding by generating an embedding using at least one data request parameter of the first user request. The embedding space comprises embeddings of one or more user requests to the endpoint. More particularly, the embedding space may contain embeddings of user requests corresponding to previous queries that were accepted by the endpoint and/or user requests corresponding to examples of queries that comply with requirements for queries to the endpoint. In some implementations, the accepted/example queries may be stored in a database (such as the queries database 130 of FIG. 1) in association with their corresponding user requests, and the embedding space may comprise embeddings of all or a subset of the user requests stored in the database.

In operation 306, the computing system identifies a matching embedding for the first embedding. The matching embedding represents a closest neighbor of the first embedding in the embedding space. In at least some implementations, the computing system performs a vector similarity search of the embedding space to locate an embedding that is closest to the first embedding, as determined using a suitable distance metric. Given the first embedding, the computing system may perform a search of the embedding space (of user requests) for vectors based on their similarity to the first embedding. Based on the results of the search, a vector that is most similar to the first embedding may be determined to be the matching embedding.

The computing system retrieves a second query associated with the matching embedding, in operation 308. More particularly, the computing system identifies a user request that is associated with the matching embedding, and the second query is determined to be the query corresponding to the user request. In some implementations, the computing system may determine that a second embedding satisfies a certain distance criterion with respect to the first embedding. The second embedding may, for example, be a vector that is within a threshold distance of the first embedding. For example, the second embedding may correspond to a previous user request that is identical (or nearly identical) to the first user request. In such case, the computing system may simply retrieve the second query from cache memory, rather than instruct an LLM to generate a new query. The second query may comprise a query, retrieved from cache memory, that is associated with the second embedding.

In operation 310, the computing system provides, to an LLM, an input prompt that includes the second query as an example. The input prompt may include the data request parameters of the data retrieval request and an indication of the second query. In particular, the second query may be inserted in the input prompt as an example query. For example, the LLM may be instructed explicitly to use the second query as an example when generating the new query corresponding to the first user request.

In operation 312, the computing system receives, from the LLM, a result including the generated query. The result may indicate information about the generated query, such as the query language, data fields, arguments, etc. The generated query may be provided to the user device as a response to the first user request. That is, the computing system may output the generated query responsive to receiving the first user request via the user device. The requesting user may then modify the generated query, incorporate the query into source code, or otherwise manipulate the code of the generated query. Additionally, or alternatively, the generated query may be automatically transmitted to the endpoint (or associated API). In particular, the computing system may transmit the generated query directly to the endpoint without obtaining an explicit confirmation from the requesting user. In this way, the endpoint may be queried automatically using the generated query (operation 314).

Figure 4:
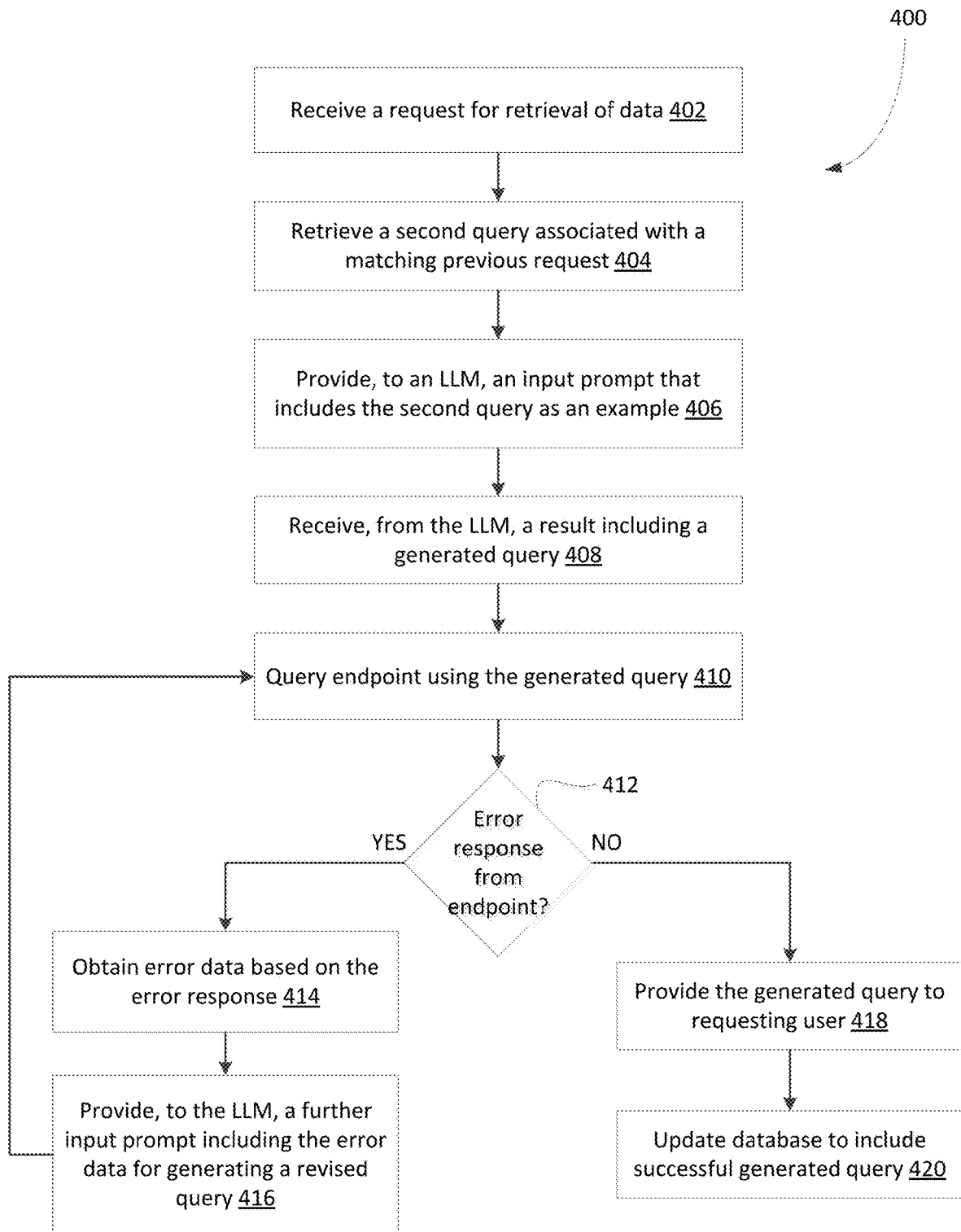
FIG. 4 shows, in flowchart form, an example method for automatically refining source code for interacting with an endpoint.

Reference is now made to FIG. 4, which shows, in flowchart form, an example method 400 for automatically refining source code for interacting with an endpoint. The method 400 may be implemented, at least in part, on a computing system for source code generation, such as the system 100 of FIG. 1. The operations of method 400 may be performed in addition to, or as alternatives of, one or more of the operations of methods 200 and 300.

In operation 402, the computing system receives a first user request for retrieval of data from an endpoint. The first user request may be expressed in natural language and contain an indication of request parameters associated with the data retrieval request. The computing system retrieves a second query associated with a matching previous request, in operation 404. The second query may be determined in accordance with the techniques described with reference to methods 200 and 300. For example, in some implementations, the computing system may generate embeddings of the first user request as well as any previous user requests corresponding to queries that were accepted by the endpoint. The second query may be determined based on identifying an embedding of a previous user request that is the closest match to the embedding of the first user request. In particular, the query corresponding to the matching embedding is designated as the second query.

In operation 406, the computing system provides, to an LLM, an input prompt that specifies the second query as an example. The second query may, for example, be inserted into an input prompt to the LLM with instructions to generate a query corresponding to the first user request. The LLM outputs, to the computing system, a result including the generated query (operation 408).

The computing system queries the endpoint by transmitting, to the endpoint, the generated query, in operation 410. If the computing system receives, from the endpoint, a response indicating an error associated with the generated query, the computing system may obtain error data associated with the generated query based on the error response (operation 414). The error data may include, for example, an indication of one or more error locations in source code associated with the generated query. An error location may be identified by at least one of a line number of character number containing erroneous code.

The computing system then provides, to the LLM, a further input prompt for instructing the LLM to generate a revised query, in operation 416. The input prompt may include the error data associated with the generated query. That is, a representation of the error data may be inserted in an input prompt to the LLM with instructions to generate a new query corresponding to the first user request. This process of instructing the LLM to generate a query corresponding to the first data request based on iteratively modifying an input prompt to the LLM may proceed until a successful response is received from the endpoint.

If, on the other hand, there is no error response from the endpoint, the computing system provides the generated query to the requesting user (operation 418). In particular, the computing system may receive a response indicating that the generated query is accepted by the endpoint. The response may include first data (e.g., field values of data objects) from the endpoint associated with data request parameters of the first user request. The computing system may then update a knowledge based, such as a queries database, to include the generated query as an accepted (or successful) query for the endpoint, in operation 420. For example, the generated query may be stored in a queries database in association with the first user request.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some implementations, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices.

The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
   receiving, via a computing device, a request for retrieval of data satisfying one or more criteria, the request including at least one data request parameter;
   generating a first embedding based on the request in an embedding space;
   locating a second embedding in the embedding space from amongst a set of embeddings of one or more previous queries, the second embedding being the embedding of the set of embeddings that is closest to the first embedding in the embedding space;
   in response to determining that the first and second embeddings satisfy a defined distance criterion:
      retrieving, from cache memory, the previous query associated with the second embedding; and
      outputting, to the computing device, the retrieved previous query in a response to the request for retrieval of data;
   in response to determining that the first and second embeddings do not satisfy the defined distance criterion:
      providing, to a large language model (LLM), a first input prompt for instructing the LLM to generate a query purporting to retrieve data satisfying the one or more criteria, the first input prompt including the at least one data request parameter and the previous query associated with the second embedding as an example;
      receiving, from the LLM, a result including the generated query;
      transmitting the generated query to a server endpoint;
      receiving, from the server endpoint, a server response including error data indicating a source code error associated with the generated query; and
      providing, to the LLM, a further input prompt for instructing the LLM to generate a revised query, the further input prompt obtained based on modifying the first input prompt to include the error data.

2. The method of claim 1, wherein the first embedding is generated based on the at least one data request parameter.

3. The method of claim 1, wherein the error data includes an indication of one or more error locations in computer code associated with the generated query.

4. The method of claim 3, wherein an error location is identified by at least one of a line number or character number containing erroneous code.

5. The method of claim 1, further comprising:
   transmitting, to the server endpoint, the generated revised query;
      receiving, from the server endpoint, a response indicating that the generated revised query is accepted by the server endpoint; and
      updating the database by including the generated revised query.

6. The method of claim 5, wherein the response includes first data from the endpoint associated with the at least one data request parameter.

7. The method of claim 1, wherein determining that the first and second embeddings satisfy the defined distance criterion comprises determining that a distance between the first embedding and the second embedding is less than a defined threshold distance.

8. The method of claim 1, further comprising:
   in response to determining that the previous query associated with the second embedding produced an error response from the server endpoint, generating an alert notification indicating that the request is not supported by the server endpoint without making a call to the LLM.

9. A computing system, comprising:
   a processor;
   a memory coupled to the processor, the memory storing processor-executable instructions that, when executed by the processor, are to cause the processor to:
      receive, via a computing device, a request for retrieval of data satisfying one or more criteria, the request including at least one data request parameter;
      generate a first embedding based on the request in an embedding space;
      locate a second embedding in the embedding space from amongst a set of embeddings of one or more previous queries, the second embedding being the embedding of the set of embeddings that is closest to the first embedding in the embedding space;
in response to determining that the first and second embeddings satisfy a defined distance criterion:
retrieve, from cache memory, the previous query associated with the second embedding; and
output, to the computing device, the retrieved previous query in a response to the request for retrieval of data;
in response to determining that the first and second embeddings do not satisfy the defined distance criterion:
provide, to a large language model (LLM), a first input prompt for instructing the LLM to generate a query purporting to retrieve data satisfying the one or more criteria, the first input prompt including the at least one data request parameter and the previous query associated with the second embedding as an example;
receive, from the LLM, a result including the generated query;
transmit the generated query to a server endpoint;
receive, from the server endpoint, a server response including error data indicating a source code error associated with the generated query; and
provide, to the LLM, a further input prompt for instructing the LLM to generate a revised query, the further input prompt obtained based on modifying the first input prompt to include the error data.

10. The computing system of claim 9, wherein the first embedding is generated based on the at least one data request parameter.

11. The computing system of claim 9, wherein the error data includes an indication of one or more error locations in computer code associated with the generated query.

12. The computing system of claim 11, wherein an error location is identified by at least one of a line number or character number containing erroneous code.

13. The computing system of claim 9, wherein the instructions, when executed, are to further cause the processor to:
transmit, to the server endpoint, the generated revised query;
receive, from the server endpoint, a response indicating that the generated revised query is accepted by the server endpoint; and
update the database by including the generated revised query.

14. The computing system of claim 9, wherein the response includes first data from the endpoint associated with the at least one data request parameter.

15. The computing system of claim 9, wherein determining that the first and second embeddings satisfy the defined distance criterion comprises determining that a distance between the first embedding and the second embedding is less than a defined threshold distance.

16. The computing system of claim 9, wherein the instructions, when executed, further configure the processor to:
in response to determining that the previous query associated with the second embedding produced an error response from the server endpoint, generate an alert notification indicating that the request is not supported by the server endpoint without making a call to the LLM.

17. A non-transitory computer-readable medium storing processor-executable instructions that, when executed by a processor, are to cause the processor to:
receive, via a computing device, a request for retrieval of data satisfying one or more criteria, the request including at least one data request parameter;
generate a first embedding based on the request in an embedding space;
locate a second embedding in the embedding space from amongst a set of embeddings of one or more previous queries, the second embedding being the embedding of the set of embeddings that is closest to the first embedding in the embedding space
in response to determining that the first and second embeddings satisfy a defined distance criterion:
retrieve, from cache memory, the previous query associated with the second embedding; and
output, to the computing device, the retrieved previous query in a response to the request for retrieval of data;
in response to determining that the first and second embeddings do not satisfy the defined distance criterion:
provide, to a large language model (LLM), a first input prompt for instructing the LLM to generate a query purporting to retrieve data satisfying the one or more criteria, the first input prompt including the at least one data request parameter and the previous query associated with the second embedding as an example;
receive, from the LLM, a result including the generated query;
transmit the generated query to a server endpoint;
receive, from the server endpoint, a server response including error data indicating a source code error associated with the generated query; and
provide, to the LLM, a further input prompt for instructing the LLM to generate a revised query, the further input prompt obtained based on modifying the first input prompt to include the error data.

18. The computer-readable medium of claim 17, wherein the first embedding is generated based on the at least one data request parameter.

\* \* \* \* \*